United States Patent
Fitzgerald (10) Patent No.: US 7,058,711 B2
(45) Date of Patent: Jun. 6, 2006

(54) VIRTUAL NETWORK MANAGEMENT

(75) Inventor: Christopher A. Fitzgerald, Boulder, CO (US)

(73) Assignee: Avaya Technology Corp., Basking Ridge, NJ (US)

(*) Notice: Subject to any disclaimer, the term of this patent is extended or adjusted under 35 U.S.C. 154(b) by 701 days.

(21) Appl. No.: 10/117,509

(22) Filed: Apr. 4, 2002

(65) Prior Publication Data
US 2003/0191830 A1    Oct. 9, 2003

(51) Int. Cl.
G06F 15/173    (2006.01)
G06F 15/16    (2006.01)

(52) U.S. Cl. .................. 709/224; 709/219; 709/227

(58) Field of Classification Search ........ 709/217–229; 717/168–178; 713/200–202; 707/104.1; 714/4
See application file for complete search history.

(56) References Cited

U.S. PATENT DOCUMENTS

| | | | | |
|---|---|---|---|---|
| 6,009,274 A * | 12/1999 | Fletcher et al. | ........... | 717/173 |
| 6,070,012 A * | 5/2000 | Eitner et al. | ........... | 717/168 |
| 6,085,243 A * | 7/2000 | Fletcher et al. | ........... | 709/224 |
| 6,131,112 A * | 10/2000 | Lewis et al. | ........... | 709/207 |
| 6,349,337 B1 * | 2/2002 | Parsons et al. | ........... | 709/227 |
| 6,629,138 B1 * | 9/2003 | Lambert et al. | ........... | 709/224 |
| 6,725,377 B1 * | 4/2004 | Kouznetsov | ........... | 713/201 |
| 6,748,525 B1 * | 6/2004 | Hubacher et al. | ........... | 713/1 |
| 6,751,794 B1 * | 6/2004 | McCaleb et al. | ........... | 717/168 |
| 6,779,023 B1 * | 8/2004 | Tognazzini | ........... | 709/208 |
| 6,829,687 B1 * | 12/2004 | Pai | ........... | 711/162 |
| 6,877,037 B1 * | 4/2005 | Adachi | ........... | 709/227 |
| 2002/0091821 A1 * | 7/2002 | Katayama et al. | ........... | 709/224 |
| 2002/0100036 A1 * | 7/2002 | Moshir et al. | ........... | 717/173 |

* cited by examiner

Primary Examiner—William C. Vaughn, Jr.
Assistant Examiner—Joseph E. Avellino
(74) Attorney, Agent, or Firm—Sheridan Ross P.C.

(57) ABSTRACT

A system providing for virtual network management is disclosed. A system in accordance with the present invention allows a service provider to remotely manage one or more client network management systems. The security of the client network management systems is advanced by only allowing communications between a client network management system and the service provider that have been initiated by the client network management system. A mirror image of a client network management system is maintained by the service provider as a virtual network management system. Data included in the virtual network management system is periodically updated with data received from the client network management system. Instructions or data may be passed from the service provider to the client network management system in reply to communications initiated by the client network management system. The present invention is particularly useful in connection with the remote management of client networks with respect to which security is a concern.

16 Claims, 5 Drawing Sheets

VIRTUAL NETWORK MANAGEMENT

FIELD OF THE INVENTION

The present invention relates to virtual network management. In particular, the present invention relates to managing client networks from a remote location.

BACKGROUND OF THE INVENTION

Computer networks are vital to the operation of many business enterprises. Such networks include interconnected computers, telecommunications systems, or converged environments in which voice and data are passed across a common network. Because such networks provide functions that are critical to the operation of business enterprises, their maintenance is of considerable importance.

In order to maintain and troubleshoot networks, outside service providers may be employed. If outside service providers are provided access to the client network, many maintenance and repair operations can be performed remotely. However, remote access to a client network is often undesirable from the perspective of the client, as the access channel provided for the service provider can be exploited by third parties. For example, modem access in connection with software, such as PC ANYWHERE, that allows for the remote operation of computer systems, can potentially be exploited by unauthorized persons to access the client network.

In order to address client concerns regarding network security, virtual private networks, firewalls, and password protection has been utilized. However, such solutions can add expense to the operation of a network, and have certain vulnerabilities.

SUMMARY OF THE INVENTION

The present invention is directed to solving these and other problems and disadvantages of the prior art. Generally, according to the present invention, a client network management system is interconnected to a communication network, such as the Internet. According to the present invention, the client network management system may contact a service provider network management system over the communication network to post various types of information. In reply to the posting, the service provider network management system can request additional data, or provide updated configuration information, code, or both updated configuration information and code to the customer network management system. The service provider network management system cannot initiate communications with the client network management system. Accordingly, the client network management system controls whether communications are initiated with the service provider network management system.

In accordance with an embodiment of the present invention, the service provider network management system maintains a virtual database, that mirrors the information concerning the operation of the client network management system stored on a client network management system database. In this way, the service provider network management system is capable of establishing a virtual copy of the client network management system. The establishment of a virtual network management system allows the service provider to appropriately manage the client network management system, to troubleshoot hardware and software related problems on the client system, and to repair software related problems on the client system, without requiring access to the actual client network management system in real time.

These and other advantages and features of the invention will become more apparent from the following description of an illustrative embodiment of the invention taken together with the drawings.

DETAILED DESCRIPTION

Figure 1:
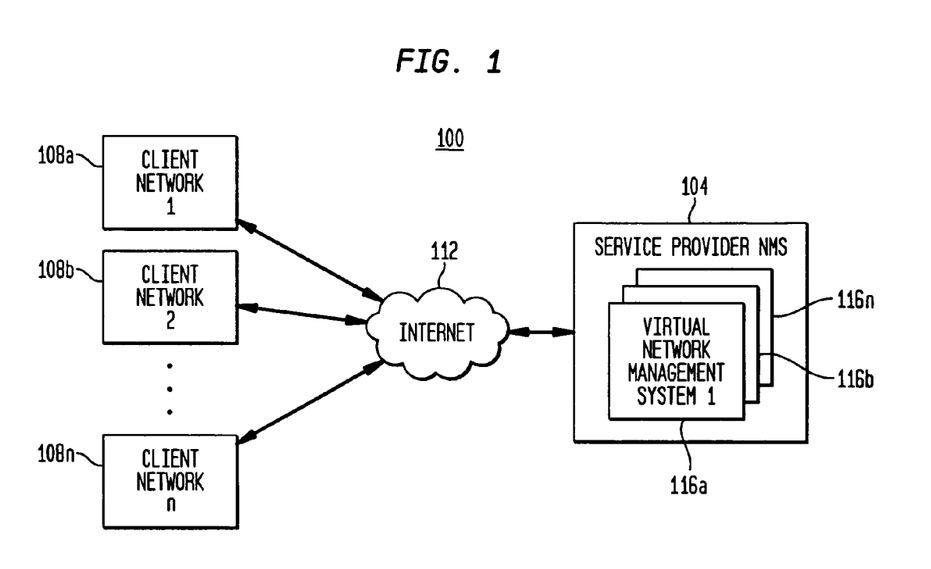
FIG. 1 is a block diagram of client networks interconnected to a service provider network management system in accordance with an embodiment of the present invention.

With reference now to FIG. 1, a remote network management system 100 in accordance with an embodiment of the present invention is illustrated. The system 100 generally includes a service provider network management system 104 interconnected to one or more client networks (or switches) 108 by a communication network 112. In general, the service provider network management system 104 may be implemented using one or more general purpose computers. The client network 108 may comprise any voice and/or data network. For example, the client network 108 may comprise a private branch exchange (PBX). In the embodiment of the remote network management system 100 illustrated in FIG. 1, the communication network 112 comprises the Internet. In addition or as an alternative, the communication network 112 may comprise a switched circuit network, such as the public switched telephone network (PSTN), a private intranet, or another communications system.

For each of the client networks 108, a virtual network management system 116 is established on the service provider network management system 104. The establishment of virtual network management systems 116 on the service provider network management system 104 allows the service provider to remotely manage client networks 108, even in the absence of real time access to the client networks 108.

Figure 2:
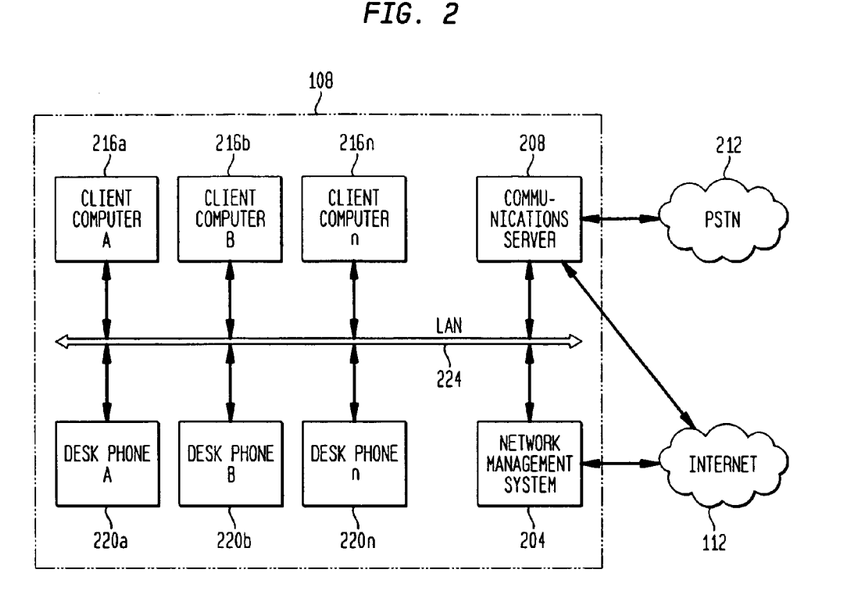
FIG. 2 is a block diagram of a client network in accordance with an embodiment of the present invention.

In FIG. 2, a client network 108 is illustrated in block diagram form. As shown in FIG. 2, a client network 108 in accordance with the present invention includes a client network management system 204 interconnected to the communication network 112, for communicating with the service provider network management system 104. In addition, the client network 108 includes a communications server 208. The communications server 208 may control and facilitate communications between nodes on the client network 108. The communications server 208 may also provide interfaces to interconnect the client network 108 to communications networks, including the communication network 112. For example, in FIG. 2, the communications server 208 is illustrated as interconnecting the client network 108 to both the communication network 112 used to interconnect the network management system 204 to the service provider network management system 104, and to the public switched telephone network (PSTN) 212. Accordingly, the communications server 208 may facilitate communications between communication nodes associated with the client network 108 and communication nodes located outside of the client network 108.

Examples of communication nodes that may be associated with the client network 108 include client computers 216 and desk telephones 220. Accordingly, it can be appreciated that the client network 108 may comprise a data network, a voice network, or a combined voice and data network. As a further example, it should be appreciated that the client network 108 may comprise a private branch exchange (PPX) telephony network. The various components that may be associated with the client network 108 (e.g., the client network management system 204, the communications server 208, the client computers 216, and the desk telephones 220) may be interconnected to one another by a local communication network 224, such as a local area network (LAN).

The communications server 208 may include basic communications functions, including telecommunications functions such as voice messaging and other telephony features. The communications server 208 may also include an interface with the PSTN 212 and an interface with the communication network 112. The communications server may comprise a general purpose computer. Where the client network 108 comprises a PBX, the communications server 208 may comprise a Definity Server available from Avaya, Inc. The client computers 216 may include general purpose computers, such as personal computers. In addition, the client computers 216 may include devices such as personal digital assistants (PDAs) and other computing devices, including devices capable of implementing soft telephones. The desk telephones 220 may comprise dedicated Internet protocol (IP) telephones. In addition to wire line connections, it should be appreciated that the local communication network 224 may comprise wireless interconnections with the various components of the client network 108, such as the client computers 216 and the desk telephones 220.

Figure 3:
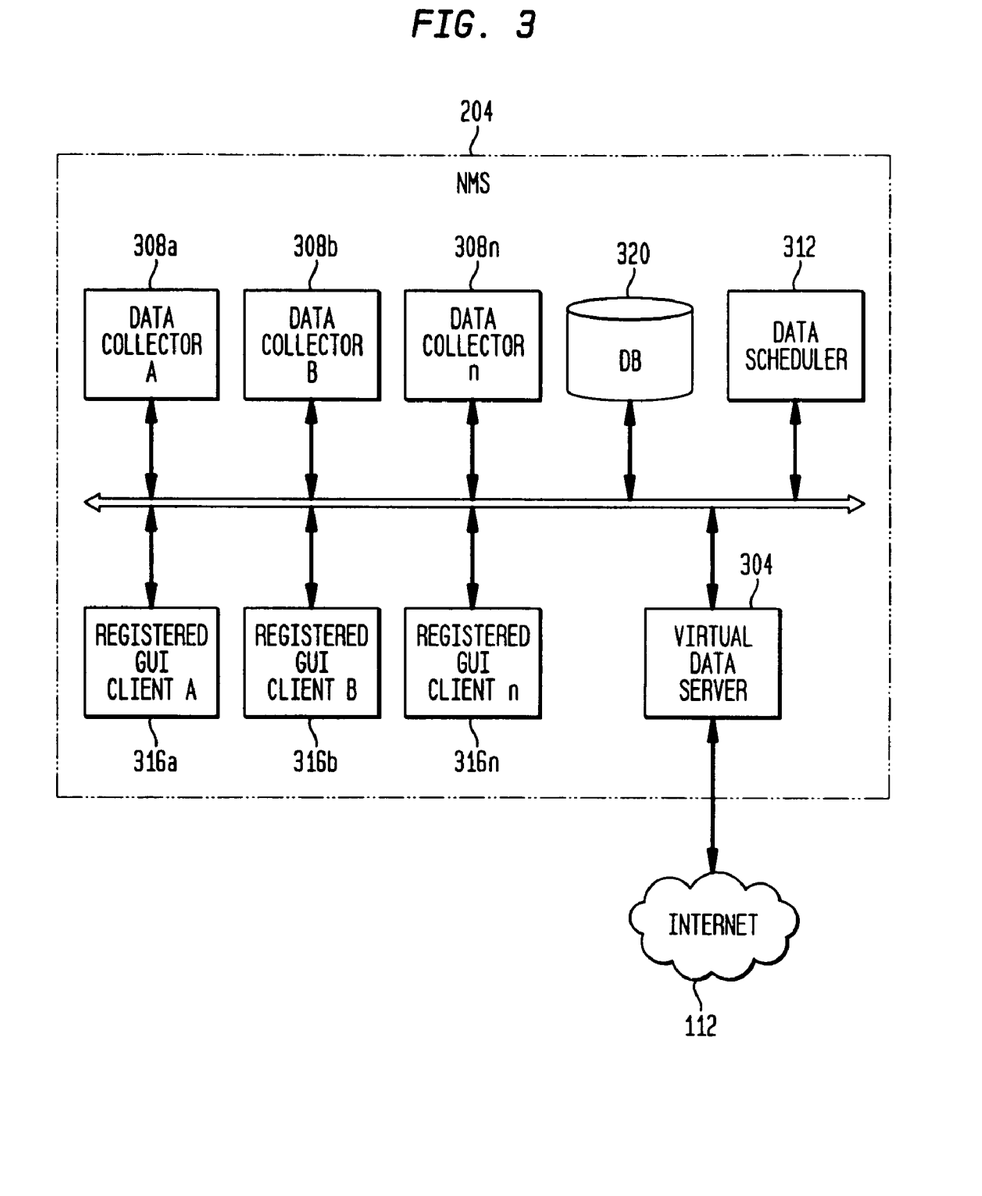
FIG. 3 is a functional block diagram illustrating a client network management system in accordance with an embodiment illustrating the present invention.

With reference now to FIG. 3, major functional components of a client network management system 204 in accordance with an embodiment of the present invention are illustrated. In general, the client network management system 204 includes a virtual data server 304, which serves to interconnect the client network management system 204 to the service provider network management system 104 (see FIG. 1) across the communication network 112. In addition, the virtual data server 304 initiates contact with the service provider network management system 104 according to a predetermined schedule, or in response to the collection of certain data concerning the client network 108 with which the virtual data server 304 is associated. For example, if a particular number of faults of a certain type are observed, the virtual data server 304 may autonomously initiate an unscheduled communication with the service provider network management system 104.

The client network management system 204 may additionally include one or more data collectors 308. In general, the data collectors 308 each collect a particular type of data concerning the client network 108. For example, a first data collector 308*a* may collection information regarding the current configuration of the client network 108. A second data collector 308*b* may collect information regarding one or more performance parameters concerning the client network 108. As a further example, a third data collector 308*n* may collect information regarding general or specific faults detected in connection with the client network 108. Accordingly, it can be appreciated that a data collector 308 may be established for each category or type of information concerning the client network 308 for which monitoring is desired.

The data scheduler 312 may be used to determine when data is collected by the data collectors 308 established in connection with the client network 108. For example, the first data collector 308*a* in the present example may be scheduled by the data scheduler 312 to collect current configuration information hourly or whenever the configuration of the client network 108 has been altered. As a further example, the second data collector 308*b* may be scheduled by the data scheduler 312 to collect performance information every half hour. As still a further example, the third data collector 308*n* may be instructed by the data scheduler 312 to continuously monitor the client network 108 for faults.

One or more registered graphical user interfaces (GUIs) 316 may be provided to allow a local administrator or administrators to configure various aspects of the operation of the client network 108. For example, a registered GUI client 316 may be used by an administrator to indicate to a data collector 308 the internet protocol (IP) address of the switch (i.e. the client network 108) for which data is being collected. In addition, a registered GUI client 316 may be used to assign local network addresses or extensions to devices (e.g., client computers 216 and desk telephones 220) associated with the client network 108.

A database 320 may be provided for storing various information used by the client network 108. For example, the database 320 may serve as a repository for data collected by the various data collectors 308. In addition, the database 320 may serve as a repository for various configuration information concerning the client network 108.

Figure 4:
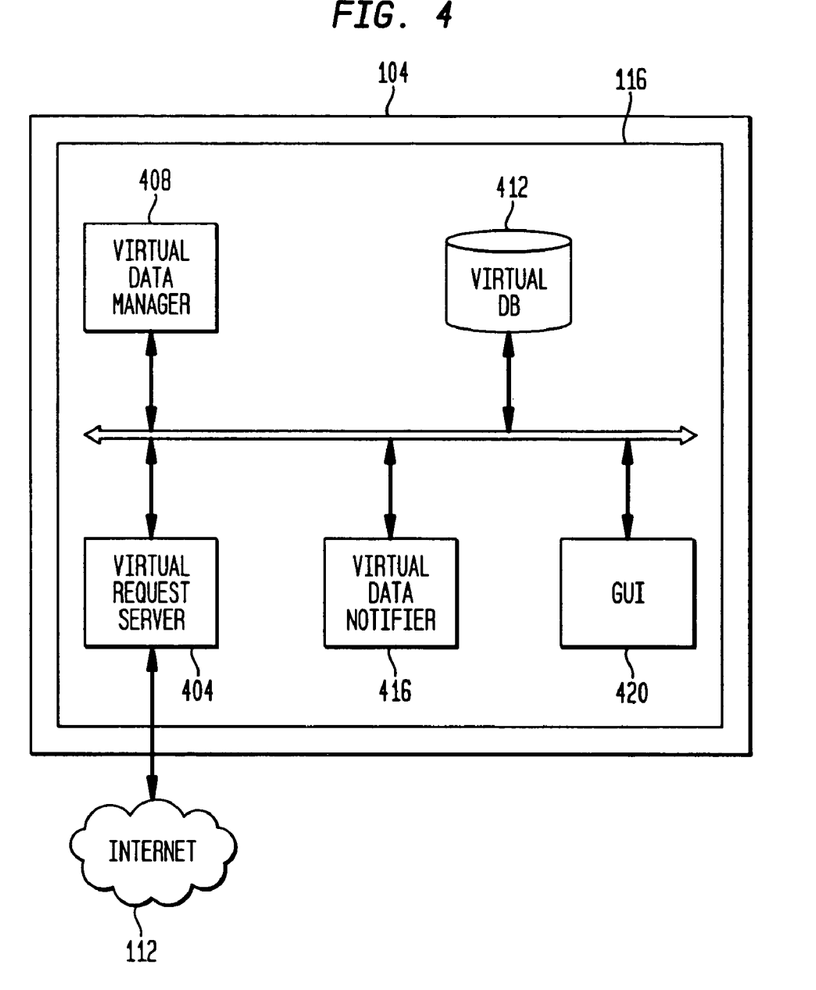
FIG. 4 is a functional block diagram of a service provider virtual network management system in accordance with an embodiment of the present invention.

With reference now to FIG. 4, the major functional components of a service provider network management system 104, and in particular of a virtual network management system 116, in accordance with an embodiment of the present invention are illustrated. In general, the virtual network management system 116 includes a virtual request server 404. The virtual request server 404 receives communications from the virtual data server 304 (see FIG. 3) of the client network management system 204 transmitted over the communication network 112. The virtual request server 404 formulates replies to the communications received from the virtual data server 304. For instance, the virtual request server 404 may reply to communications from the client network management system 204 that contain information regarding faults occurring on the client network 108 with a request that certain diagnostic procedures be executed by the network management system 204, and that the results of the testing be provided to the service provider network management system 104 in a later communication.

A virtual data manager 408 mirrors the virtual data server 304 of the client network management system. In general, the virtual data manager 408 receives data sent from the client network management system 204, and stores that data in a virtual database 412.

A virtual data notifier 416 may issue alerts, or initiate some other notification procedure in response to faults or other conditions detected in connection with the client network 108 received from the client network management system 204. For example, the virtual data notifier 416 may sound an alarm or page a technician when a condition requiring immediate attention is detected.

A graphical user interface 420 may be used by a technician or technicians at the service provider to diagnose fault conditions or to otherwise take action to maintain or repair a client network 108 remotely. In particular, from the data received according to scheduled reports or in response to requests from the virtual request server 404 that is placed in the virtual database 412 by the virtual data manager 408, a technician has access to a virtual or mirrored copy of the client network management system 204. Accordingly, the service provider network management system 104 comprises a virtual network management system 116. Furthermore, a virtual network management system 116 may be established on a service provider network management system 104 for each client network 108 managed by a service provider.

Figure 5:
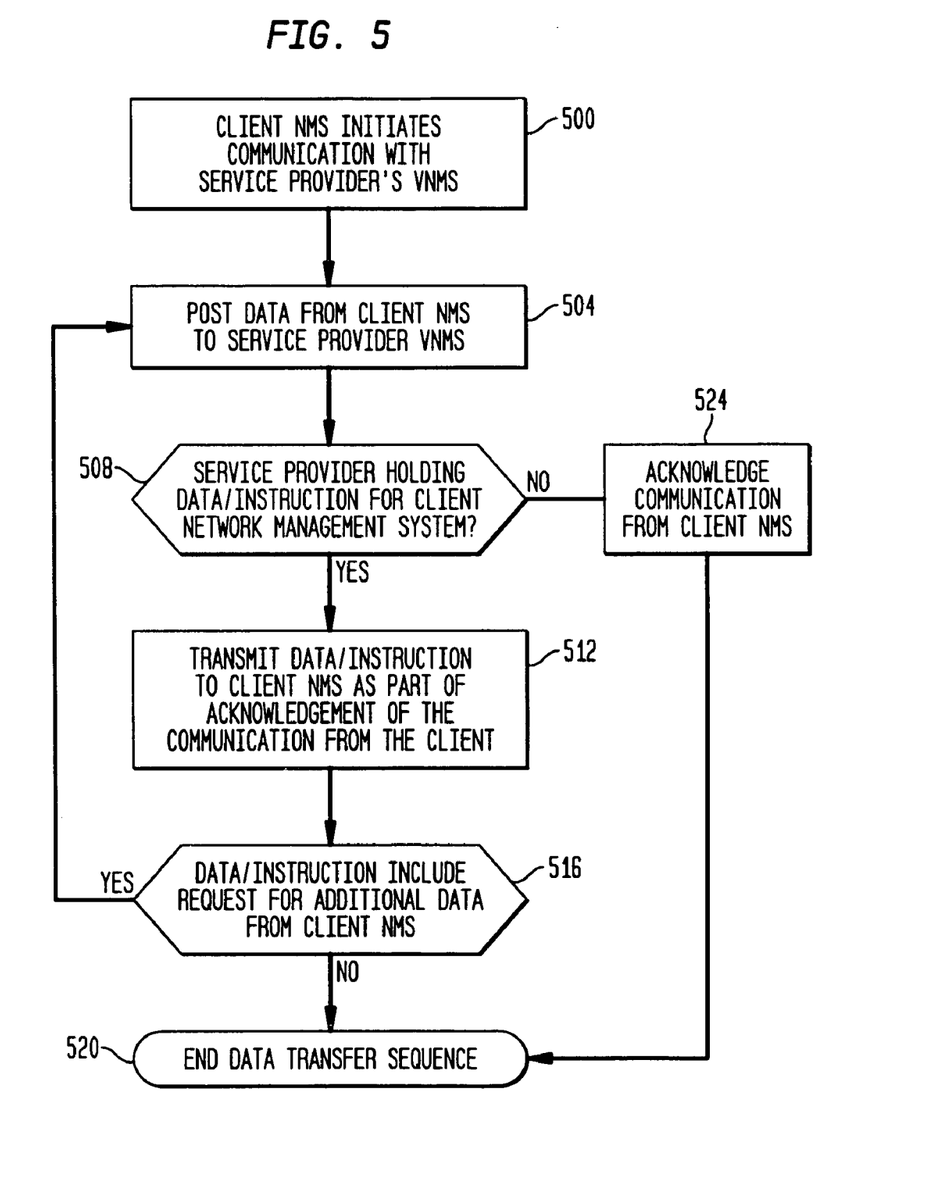
FIG. 5 is a flow chart illustrating the operation of a remote network management system in accordance with an embodiment of the present invention.

With reference now to FIG. 5, the operation of an embodiment of a remote network management system 100 in accordance with an embodiment of the present invention is illustrated. Initially, at step 500, the client network management system 204 associated with a client network 108 initiates communication with the service provider's network management system 104, and in particular with the virtual network management system 116 associated with that client network management system 204 of the client network 108. It should be appreciated that, according to the present invention, communication sessions between the client network management system 204 and the virtual network management system 116 are always initiated by the client network management system 204. That is, although a virtual network management system 116 may request certain information from the client network management system 204, such requests are made in the context of a response to a communication from the client network management system 204.

At step 504, data from the client network management system 204 is posted to the virtual network management system 116. The data may include data routinely collected by the client network management system 204. In addition or alternatively, the data may include information that was requested by the virtual network management system 116 as part of a response to an earlier client network management system 104 initiated communication.

At step 508, the virtual network management system 104 determines whether it is holding data or instructions for transmission to the client network management system 204. If data or instructions for the client network management system 204 are being held by the virtual network management system 116, the data or instruction is transmitted to the client network management system as part of the acknowledgment of the communication initiated by the client (step 512). An example of data that may be provided from the virtual network management system 116 to the client network management system 204 includes revised configuration data, such as changes in the dialing plan used by the client network 108. An example of instructions provided from the virtual network management system 116 to the client network management system 204 includes instructions to test an aspect of the operation of the client network 108 and return the results of that testing. If the data or instruction transmitted to the client network management system 204 includes a request for additional data from the client network management system 204 (step 516) the system returns to step 504, during which step additional data from the client network management system 204 is posted to the service provider virtual network management system 104.

If at step 516 the data or instruction transmitted as part of the acknowledgment does not include a request for additional data, the data transfer sequence is ended (step 520). It should be appreciated that, in response to a request for additional data from the client network management system 204 (step 516), the client network management system 204 may acknowledge the request and terminate the data transfer sequence. The requested data may then be provided to the service provider network management system 104 in a later communication initiated by the client network management system 204.

If at step 508 it is determined that the service provider network management system 104 is not holding data or instructions for the client network management system 204, the communication from the client network management system 204 is acknowledged (step 524) and the data transfer sequence then ends (step 520).

The communications between the client network management system 204 and the virtual network management system may be according to the protocol or protocols required by the communication network. For example, the communications may be according to the HTTPS protocol where a Server Socket Layer (SSL) encryption session is used in connection with communications conducted over a communication network 112 that comprises the Internet.

From the above description, it can be appreciated that a remote network management system 100 in accordance with the present invention provides a virtual network management system 116 for each client network management system 204 administered by the service provider. Accordingly, by providing, for example, a Web address allowing contact from client contact management systems 204, a service provider may remotely manage a number of client networks 108 from a service provider network management system 104 that is remote with respect to the client networks 108.

In addition, it should be appreciated that a remote network management system 100 in accordance with an embodiment of the present invention does not allow for communication sequences that are initiated by the service provider. Instead, communications sequences are initiated by the client network management system 204. Accordingly, the present invention may provide for the remote management of client networks 108, without requiring additional hardware, such as virtual private network routers, and without requiring that the client network 108 accept communications initiated by a system external to the client network 108.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments to the extent permitted by the prior art.

What is claimed is:

1. A method for remotely managing a network, comprising:

providing a first client network comprising a first client network management system;

providing a second client network comprising a second client network management system;
providing a service provider network management system, wherein said service provider network management system is provided with an address of said first client network management system and an address of said second client network management system;
providing a communication link between said first client network management system and said service provider network management system;
providing a communication link between said second client network management system and said service provider network management system;
in response to said first client network management system initiating a communication addressed to said service provider network management system, wherein said service provider network management system cannot initiate communications with said first client network, wherein communications from said service provider network management system to said first client network management system are only completed as part of a response to a communication initiated by said first client network management system, and wherein said communication addressed to said service provider network management system is formatted according to an Internet protocol; the step of:
  establishing at least a first virtual network management system on said service provider network management system, wherein said first virtual network management system comprises a database that mirrors said first client network management system, and wherein a technician using said service provider network management system can manage said first client network without having real time access to said first client network; and
in response to said second client network management system initiating a communication addressed to said service provider network management system, wherein said service provider network management system cannot initiate communications with said second client network, wherein communications from said service provider network management system to said second client network management system are only completed as part of a response to a communication initiated by said second client network management system, and wherein said communication addressed to said service provider network management system is formatted according to an Internet protocol; the step of:
  establishing at least a second virtual network management system on said service provider network management system, wherein said second virtual network management system comprises a database that mirrors said second client network management system, and wherein a technician using said service provider network management system can manage said second client network without having real time access to said second client network.

2. The method of claim 1, further comprising:
generating in said service provider network management system an acknowledgment of said communication, wherein said acknowledgement comprises at least one of a request for data and data for use by said client network.

3. The method of claim 1, wherein said Internet protocol comprises HTTPS.

4. The method of claim 1, wherein said first client network comprises a virtual private network.

5. The method of claim 1, wherein said first client network comprises a private branch exchange.

6. A system for remotely managing a network, comprising:
a first client network, comprising:
  a first plurality of communication nodes;
  a communication link interconnecting said nodes;
  a first client server;
  a first client network management system;
a second client network, comprising:
  a second plurality of communication nodes;
  a communication link interconnecting said nodes;
  a second client server;
  a second client network management system;
a service provider network management system, comprising:
  a first virtual database including a mirrored copy of said first client network management system of said first client network, wherein said first virtual database is established in response to said first client network management system initiating a communication addressed to said service provider network management system, wherein a technician using said service provider network management system can access said first virtual database to manage said first client network without having real time access to said first client network;
  a second virtual database including a mirrored copy of said second client network management system of said second client network wherein said second virtual database is established in response to said second client network management system initiating a communication addressed to said provider network management system, wherein a technician using said service provider network management system can access said second virtual database to manage said second client network without having real time access to said first client network;
a communication network interconnecting said first and second client networks and said service provider network, wherein communication between said first and second client networks and said service provider network may be initiated by one of said client networks and may not be initiated by said service provider network, and wherein said communication between one of said client networks and said service provider network is formatted according to an Internet protocol.

7. The system of claim 6, wherein at least a first of said communication nodes comprises a telephone.

8. The system of claim 6, wherein said first client network comprises a private branch exchange communications network.

9. The system of claim 6, wherein said client server of said first client network stores configuration information regarding said first client network.

10. The system of claim 9, wherein said configuration information can be at least one of altered and replaced with configuration information received from said service provider network management system in response to a communication initiated by one of said first and second client networks.

11. The system of claim 6, wherein said communication link comprises an Internet protocol communication link.

12. A method for remotely managing a client network from a service provider network management system, comprising:

receiving at said service provider network a first communication formatted according to an Internet protocol from a first client network management system;

generating a response to said first communication, wherein said response comprises at least one of substantive information related to operational aspects of a first client network obtained from a first virtual network management system related to said first client network management system and a request for data for inclusion in said first virtual network management system, and wherein a communication initiated by said service provider and addressed to said first client network that is other than a response to a communication from said first client network management system will not receive a response from said first client network;

receiving at said service provider network a second communication formatted according to an Internet protocol from a second client network management system;

generating a response to said second communication, wherein said response comprises at least one of substantive information related to operational aspects of a second client network obtained from a second virtual network management system related to said second client network management system and a request for data for inclusion in said second virtual network management system, and wherein a communication initiated by said service provider and addressed to said second client network that is other than a response to a communication from said second client network management system will not receive a response from said second client network.

13. The method of claim 12, wherein said substantive information comprises at least one of data, a request for data, and network administration information.

14. The method of claim 12, wherein said virtual client network comprises substantive information related to operational aspects of at least a first client network.

15. The method of claim 12, wherein said second communication comprises substantive information related to operational aspects of said client network.

16. The method of claim 12, wherein said Internet protocol comprises HTTPS.

* * * * *